United States Patent
Van Der Hoeven et al.

(10) Patent No.: US 11,265,212 B2
(45) Date of Patent: Mar. 1, 2022

(54) SELECTIVELY THROTTLING IMPLEMENTATION OF CONFIGURATION CHANGES IN AN ENTERPRISE

(71) Applicant: Microsoft Technology Licensing, LLC, Redmond, WA (US)

(72) Inventors: Koen Van Der Hoeven, Bellevue, WA (US); Brett Damon Alan Flegg, Redmond, WA (US); Bruno Ryuichi Yoshioka, Redmond, WA (US); David C. James, Snohomish, WA (US); Michael John Wallent, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/917,553

(22) Filed: Jun. 30, 2020

(65) Prior Publication Data

US 2021/0135940 A1 May 6, 2021

Related U.S. Application Data

(60) Provisional application No. 62/929,760, filed on Nov. 1, 2019.

(51) Int. Cl.
*G06F 15/177* (2006.01)
*H04L 41/0816* (2022.01)
(Continued)

(52) U.S. Cl.
CPC ...... *H04L 41/0816* (2013.01); *G06F 11/3409* (2013.01); *H04L 41/085* (2013.01); *H04L 41/0896* (2013.01)

(58) Field of Classification Search
CPC ............... H04L 41/0816; H04L 41/085; H04L 41/0896; G06F 11/3409
(Continued)

(56) References Cited

U.S. PATENT DOCUMENTS 8,055,732 B2 * 11/2011 Cohen ..................... H04L 67/34
709/220
8,224,930 B2 * 7/2012 Cohen ..................... H04L 67/34
709/220

(Continued)

OTHER PUBLICATIONS

"International Search Report and Written Opinion Issued in PCT Application No. PCT/US20/056226", dated Feb. 3, 2021, 11 Pages.

*Primary Examiner* — Bharat Barot
(74) *Attorney, Agent, or Firm* — Wade IP Law PLLC

(57) ABSTRACT

Techniques are described herein that are capable of selectively throttling an implementation of configuration changes in an enterprise. For instance, incremental phases of the implementation on respective subsets of clients are selectively throttled during respective periods of time by performing operations for each subset during a respective phase that precedes a respective next phase of the implementation. The operations include gathering information regarding the phase from the clients in the subset; generating a score that indicates an extent to which metrics associated with the implementation are satisfied during the phase based at least in part on the information; comparing the score to a reference score for the subset to determine whether the score is within a tolerance associated with the reference score; and selectively throttling the next phase of the implementation based at least in part on whether the score is within the tolerance.

20 Claims, 8 Drawing Sheets

(51) Int. Cl.
*G06F 11/34* (2006.01)
*H04L 41/085* (2022.01)
*H04L 41/0896* (2022.01)

(58) Field of Classification Search
USPC .................................................. 709/220–222
See application file for complete search history.

(56) References Cited

U.S. PATENT DOCUMENTS

| | | | | |
|---|---|---|---|---|
| 8,725,844 | B2* | 5/2014 | Goin | H04L 41/0853 709/220 |
| 9,229,902 | B1 | 1/2016 | Leis et al. | |
| 9,477,784 | B1* | 10/2016 | Bhave | G06F 11/3409 |
| 2005/0097517 | A1* | 5/2005 | Goin | H04L 41/0803 717/124 |
| 2006/0045039 | A1* | 3/2006 | Tsuneya | H04L 41/0816 370/318 |
| 2015/0215163 | A1* | 7/2015 | Kowalski | H04L 41/0806 709/203 |
| 2016/0173447 | A1* | 6/2016 | Achim | H04L 41/0816 726/11 |
| 2018/0232529 | A1* | 8/2018 | Mahmood | G06F 21/629 |
| 2018/0285086 | A1 | 10/2018 | O'malley et al. | |

* cited by examiner

/ 700

```
// Calculation of a score (ue_score) for one or more devices
ue_score = 0;
for each metric
{
z_score = min(5, max(-5,(instance - mean)/standard_ deviation));
metric_value = (-1*z_score + 5/10);
ue_score += metric_value * metric_weight;
}
next metric;
return ue_score;
```

FIG. 7

SELECTIVELY THROTTLING IMPLEMENTATION OF CONFIGURATION CHANGES IN AN ENTERPRISE

CROSS-REFERENCE TO RELATED APPLICATION(S)

This application claims the benefit of U.S. Provisional Application No. 62/929,760, filed Nov. 1, 2019 and entitled "Selectively Throttling Implementation of Configuration Changes in an Enterprise," the entirety of which is incorporated herein by reference.

BACKGROUND

An information technology (IT) administrator of an enterprise often manages configuration changes (e.g., software deployments) to the enterprise all at once and does not notice failures or regressions associated with the configuration changes until an end user reports such failures or regressions back to the administrator. Managing configuration changes in this manner is relatively inefficient for the administrator and may be costly to the business to which the enterprise belongs due to a loss of productivity associated with the failures or regressions.

When managing configuration changes, the administrator often has the following goals in mind: keep downtime low; keep costs low; and improve user experience of end users in the enterprise. However, the administrator may not be able to determine whether operations that are performed to manage the configuration changes are effective without AB testing the configuration changes after implementation of the configuration changes has completed. Because the hierarchy of each enterprise may be quite different from others, it may be challenging to know which actions to take to minimize costs while maximizing effectiveness of management. This ambiguity may cause management of the configuration changes to be inefficient.

Traditionally, if regression occurs with regard to implementation of configuration changes, end users have a regressed experience. In many cases, performing a bad configuration change provides a less desirable result than doing nothing at all.

SUMMARY

Various approaches are described herein for, among other things, selectively throttling an implementation of configuration changes in an enterprise. For example, client devices in an enterprise may be divided into groups. The client devices in each group may be selected based on any of a variety of factors (e.g., providing a statistically representative sample of all the client devices in the enterprise). The configuration changes may be implemented on one group of client devices at a time. In each group, the configuration changes may be implemented in phases on respective subsets of the client devices in the group. Information regarding a phase of the implementation may be used to determine (e.g., automatically determine) whether the next phase of the implementation is to be throttled. For instance, if the phase of the implementation negatively affected a user experience of end users associated with the client devices in the subset, the next phase of the implementation may be throttled (e.g., to automatically correct an issue that caused the decreased user experience or to enable an administrator to perform actions manually in an attempt to correct the issue).

Systems management typically refers to enterprise-wide administration of distributed systems (e.g., computer systems). Some example tasks that may be performed via systems management include but are not limited to anti-manipulation management, anti-virus and anti-malware management, security management, storage management, capacity monitoring, server availability monitoring and metrics, monitoring of user activities, network capacity and utilization monitoring, hardware inventory, and software inventory and installation. Systems management often includes a variety of functional components, including but not limited to data center infrastructure management, help desk management, network management, security information and event management, and configuration management. Configuration management typically handles changes in a system systematically to maintain integrity of the system. Such changes may be implemented for beneficial purposes, including but not limited to revising capability of the system; increasing performance, reliability, and/or maintainability of the system; extending life of the system; reducing cost, risk, and/or liability of the system; and correcting defect(s) of the system.

In an example approach, incremental phases of an implementation of configuration changes on respective subsets of a plurality of client devices in an enterprise are selectively throttled (e.g., automatically selectively throttled) during respective sequential periods of time by performing operations for each subset during a respective phase that precedes a respective next phase of the implementation. The operations include gathering information regarding the phase of the implementation from the client devices in the subset. The operations further include generating a score that indicates an extent to which metrics associated with the implementation are satisfied during the phase based at least in part on the information. The operations further include comparing the score to a reference score for the subset to determine whether the score is within a specified tolerance associated with the reference score. The operations further include selectively throttling the next phase of the implementation based at least in part on whether the score is within the specified tolerance associated with the reference score.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 7 shows example pseudocode for calculating a score for one or more devices in accordance with an embodiment.

Figure 1:
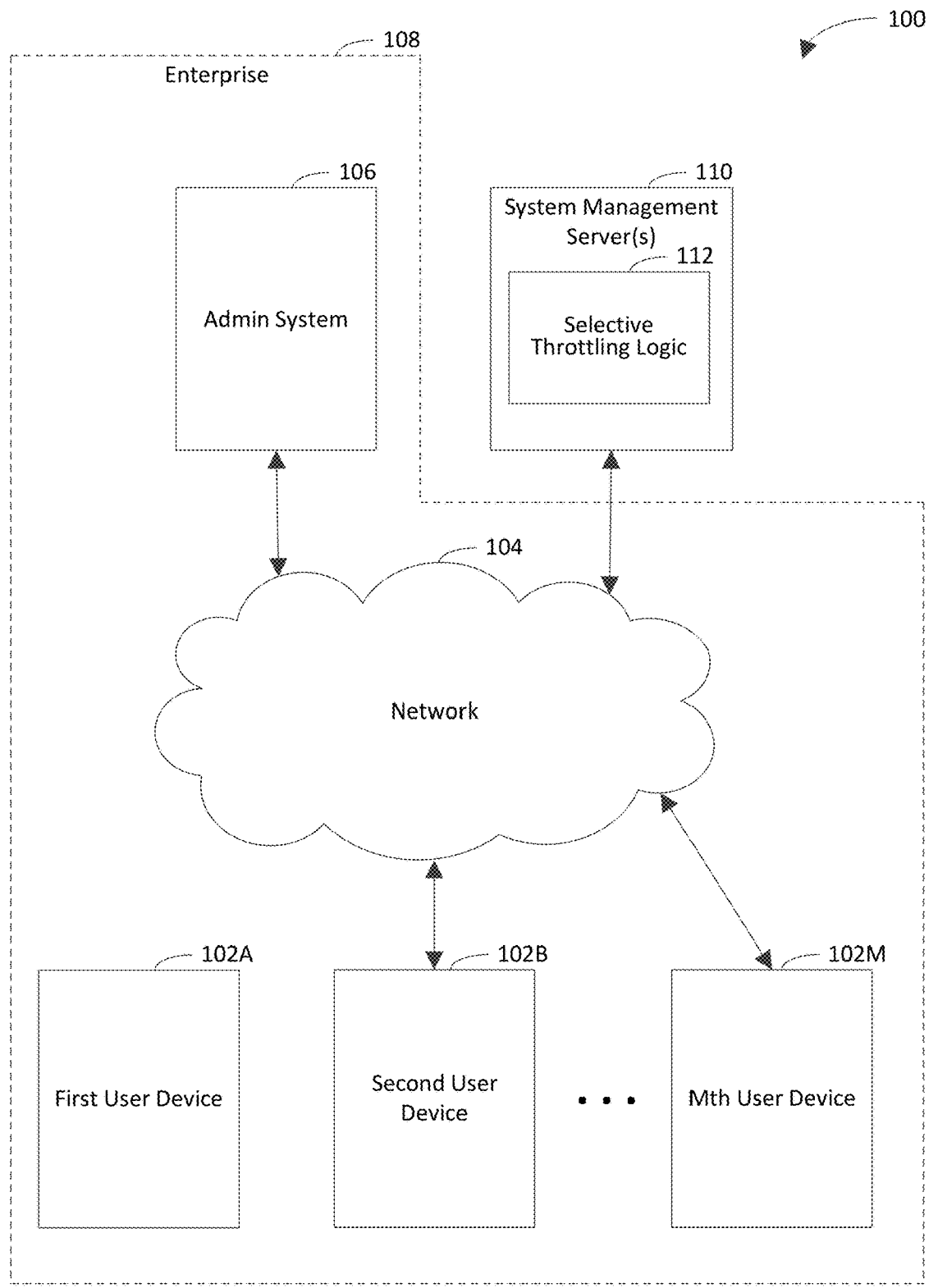
FIG. 1 is a block diagram of an example selective throttling system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of selectively throttling an implementation of configuration changes in an enterprise. For example, client devices in an enterprise may be divided into groups. The client devices in each group may be selected based on any of a variety of factors (e.g., providing a statistically representative sample of all the client devices in the enterprise). The configuration changes may be implemented on one group of client devices at a time. In each group, the configuration changes may be implemented in phases on respective subsets of the client devices in the group. Information regarding a phase of the implementation may be used to determine whether the next phase of the implementation is to be throttled. For instance, if the phase of the implementation negatively affected a user experience of end users associated with the client devices in the subset, the next phase of the implementation may be throttled (e.g., to automatically correct an issue that caused the decreased user experience or to enable an administrator to perform actions manually in an attempt to correct the issue).

Systems management typically refers to enterprise-wide administration of distributed systems (e.g., computer systems). Some example tasks that may be performed via systems management include but are not limited to anti-manipulation management, anti-virus and anti-malware management, security management, storage management, capacity monitoring, server availability monitoring and metrics, monitoring of user activities, network capacity and utilization monitoring, hardware inventory, and software inventory and installation. Systems management often includes a variety of functional components, including but not limited to data center infrastructure management, help desk management, network management, security information and event management, and configuration management. Configuration management typically handles changes in a system systematically to maintain integrity of the system. Such changes may be implemented for beneficial purposes, including but not limited to revising capability of the system; increasing performance, reliability, and/or maintainability of the system; extending life of the system; reducing cost, risk, and/or liability of the system; and correcting defect(s) of the system.

Example techniques described herein have a variety of benefits as compared to conventional techniques for implementing configuration changes in an enterprise. For instance, the example techniques may be capable of selectively throttling the implementation to control a rate at which the implementation percolates through a group of client devices in the enterprise. The example techniques may be capable of making predictions of an effect (e.g., negative effect) that the implementation of the configuration changes will have on score(s) before the configuration changes are implemented. The example techniques may determine a source of an issue regarding the implementation of the configuration changes, a degradation in performance of client devices in the enterprise that is predicted to result from the implementation, and a solution to resolve the issue. The example techniques may determine whether to implement the configuration changes and/or whether to inform an information technology (IT) administrator of the enterprise of likely issues and/or resolutions thereof regarding the implementation based on the predictions.

The example techniques may reduce an amount of time and/or resources (e.g., processor cycles, memory, network bandwidth) that is consumed to implement the configuration changes in the enterprise. For instance, by employing the techniques described herein, an amount of time that is consumed to reach a threshold of compliance may be reduced. The threshold of compliance may be defined as a specified proportion of client devices in the enterprise on which the configuration changes are to be implemented within a specified period of time.

The example techniques may increase efficiency of the IT administrator of the enterprise. For instance, the example techniques may increase an amount of data-driven information regarding the implementation of the configuration changes that is provided to the IT administrator, which may increase confidence of the IT administrator in an outcome of the implementation. For instance, reactive feedback may be provided to the IT administrator to alert the IT administrator of statistically significant reductions in score for client devices on which the implementation of the configuration changes has occurred. By increasing the amount of data-driven information that is provided to the IT administrator and/or performing actions (e.g., in real-time as the implementation progresses) to resolve issues associated with the implementation, the example techniques may reduce a number of steps that are performed by the IT administrator, an amount of effort that the IT administrator expends, and/or an amount of time that the IT administrator takes to oversee the implementation of the configuration changes in the enterprise. The example techniques may reduce a cost associated with implementing the configuration changes in the enterprise. For instance, by increasing the amount of data-driven information that is provided to the IT administrator and/or performing actions to resolve issues associate with the implementation, the IT administrator need not necessarily spend time reviewing progress of the implementation to determine potential sources of issues and/or potential actions to perform to resolve the issues. Reducing the time spent by the IT administrator to review the progress of the implementation results in a reduced cost associated with the IT administrator.

The example techniques may increase efficiency of end users in the enterprise. The example techniques may mitigate (e.g., eliminate) a loss of productivity associated with implementation of the configuration changes for the end users. By mitigating the loss of productivity of the end users, the example techniques may reduce a cost of implementing the configuration changes.

The example techniques may increase efficiency of a computing system that is used by an IT administrator to perform system management operations. For example, the example techniques may detect failures or regressions during an implementation of configuration changes sooner than conventional techniques. In accordance with this example, the failures or regressions may be detected automatically (e.g., without input from the IT administrator). The example techniques may automatically resolve detected issues, automatically inform the IT administrator of the issues and/or solutions regarding the issues, etc. The example techniques may be capable of resolving such issues in real-time as the implementation of the configuration changes progresses from one phase of the implementation to the next.

Regression analysis may be used to operationalize implementation of configuration changes in the enterprise and to determine statistically significant reductions in score for client devices with the change and without and to act upon or provide insight so that the IT administrator can take a most appropriate action moving forward.

Rather than waiting for an entire implementation of configuration changes (e.g., software deployment) to complete to detect regression, the example techniques may provide reactive feedback to the IT administrator to alert the IT administrator of statistically significant reductions in score for devices with or without the changes. By using automatic deployment rules (ADRs) to create groups for the implementation of the configuration changes, the example techniques may drive the implementation in subsets of client devices and monitor the impact of the implementation before the problem escalates. The example techniques may determine what the best client devices for the implementation are and create subsets of various sizes to which the implementation is pushed.

To facilitate effectiveness of an example technique, it may be desirable to have good metrics of what regression is and to have a good signal-to-noise ratio. The example techniques may use a variety of regression metrics that are validated as client devices receive their implementations of the configuration changes and, based on responses from the client devices, determine an efficient and effective action moving forward. After the implementation of the configuration changes on each client device, a variety of metrics are measured and may be compiled together to form a score. If the deployment makes a statistically significant reduction to the client device's score, then the automatic implementation may be halted. By tying in these metrics with metrics analyzed by a third-party (e.g., related to a snapshot of the client device), the example techniques may pull metrics directly from the client device in real-time to monitor the effect of the implementation on the client device. Following the stop, the IT administrator (if the IT administrator chooses to do so) can resume the implementation of the configuration changes despite the analytics provided or can be provided with troubleshooting information that can allow the IT administrator to make changes to the environment to improve the implementation for subsequent subsets of the computing devices.

As this model expands and learns from its client device selection and takes in the effect that implementations of configuration changes have on the client devices in the enterprise, the example techniques may make predictions prior to implementing configuration changes to determine whether the administrator should move forward.

The example techniques provide a variety of automated insights and benefits to help mitigate issues that arise during implementation of configuration changes. When an administrator sets out to implement configuration changes, ADR is used to create groups of the statistically most desirable client machines to try out the implementation of the configuration changes. Using these groups of client devices, the example techniques may then drive subsets of the client devices in each group through phased implementation, closely monitoring the impact of the implementation at each phase. By using analytics and regression analysis through a proprietary score, the example techniques may determine (a) whether the implementation of configuration changes should move forward in ever increasing phases and deploy to more client devices or (b) whether to halt the implementation and notify the administrator on the statistically most desirable actions moving forward. After acting on the feedback provided the implementation, the example techniques may continue with a new phase and will increase the score of affected devices moving forward, learning from the responses to previous actions and utilizing these learnings in future implementations. By providing a relatively high signal-to-noise ratio by learning from past actions, the example techniques may provide a more refined user experience, as compared to conventional techniques, to meet the needs and issues that arise during the implementation, while minimizing end user impact.

Examples of data inputs to measure regression include but are not limited to boot times, application crashes, central processing unit (CPU) usage, random access memory (RAM) usage, disk usage, network usage, error messages, third-party data (e.g., Desktop Analytics™ data), computer hardware data, and software data. Desktop Analytics™ software is developed and distributed by Microsoft Corporation.

A score may be a weighted average of regression measurements, third-party metrics, and environmental scaling to indicate how an implementation of configuration changes affects a client device. By utilizing the effect of configuration change implementations on past client devices, this model may provide predictions to implementations for other client devices in other subsets along with future client devices of similar types. By categorizing implementations of configuration changes, the areas of impact, and types of client devices, a score may be created to indicate whether an IT administrator should move forward with the implementation. By tracking what environmental, software, and/or hardware factors affect implementations of configuration changes to result in a net positive score, the example techniques may provide insights on actions that are relatively likely to improve the implementation (e.g., by reducing the number and/or severity of issues resulting therefrom) and, where needed, make changes to the environment to have the statistically most desirable effect on the environment.

In order to successfully carry out regression analysis, a group of client devices is determined that can facilitate an accurate determination as to whether implementation of configuration changes results in a net positive or negative score. To mitigate noise that results from this, metrics including the inputs to measure regression, are read. Previous implementation success, error messages, client health, device version, and metrics gathered from a third-party may be used to choose the client devices for the group. The group may be ever-evolving, by learning from past implementations and the follow-up subsets, the analysis can rotate client devices in this group for future implementations. Each phase of implementations may affect different client devices, with the goal of providing a robust testing environment that reflects all the client devices in the environment. To achieve this goal, a variety and diversity of client device types that accurately reflect the environment's make-up are considered so that the group is an accurate representation of the environment, which may provide an accurate feedback loop as the implementation progresses through the phases.

FIG. 1 is a block diagram of an example selective throttling system 100 in accordance with an embodiment. Generally speaking, selective throttling system 100 operates to perform system configuration operations with regard to user devices (a.k.a. client devices) 102A-102M. As shown in FIG. 1, the selective throttling system 100 includes an enterprise 108 and system management server(s) 110. The enterprise 108 includes the user devices 102A-102M, a network 104, and an admin system 106. Communication among the user devices 102A-102M, the admin system 106, and the system management server(s) 110 is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with the admin system 106. An example of a processing system is a system that includes at least one processor that is capable of manipulating data in accordance with a set of instructions. For instance, a processing system may be a computer, a personal digital assistant, etc. The user devices 102A-102M are configured to provide requests to servers (not shown) for requesting information stored on (or otherwise accessible via) the servers. For instance, a user may initiate a request for executing a computer program (e.g., an application) using a client (e.g., a Web browser or other type of client) deployed on a user device that is owned by or otherwise accessible to the user. In accordance with some example embodiments, user devices 102A-102M are capable of accessing domains (e.g., Web sites) hosted by the servers, so that the user devices 102A-102M may access information that is available via the domains. Such domains may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers.

The user devices 102A-102M are also configured to provide information to the admin system 106 automatically or in responses to inquiries from the admin system 106. For instance, such information may pertain to hardware and/or software configurations of the user devices 102A-102M (e.g., updates thereof), workloads of the user devices 102A-102M, resource utilization on the user devices, etc.

The admin system 106 is a processing system that is capable of communicating with the user devices 102A-102M. The admin system 106 is configured to perform operations to facilitate system management of the enterprise 108 in response to instructions that are received from the IT administrator of the enterprise 108. For example, the admin system 106 may provide commands to the system management server(s) 110, indicating actions that are to be performed by the system management server(s) 110 to perform system management of the enterprise 108. In another example, the admin system 106 may provide requests for information to the user devices 102A-102M. The IT administrator may make decisions regarding system management of the user devices 102A-102M and/or the network 104 based at least in part on the information that is received from the user devices 102A-102M. It will be recognized that at least some (e.g., all) of the information may be gathered by the system management server(s) 110, rather than by the admin system 106.

The system management server(s) 110 are processing systems that are capable of communicating with the enterprise 108. For instance, the system management server(s) 110 may be capable of communicating with the admin system 106 and/or the user devices 102A-102M in the enterprise 108. The system management server(s) 110 include selective throttling logic 112. The selective throttling logic 112 is configured to provide information to and/or gather information from the admin server 106 and/or the user devices 102A-102M for purposes of performing system management of the enterprise 108. For instance, the selective throttling logic 112 may push information to the user devices 102A-102M or provide the information in response to requests that are received from the user devices 102A-102M. The requests may be user-generated or generated without user involvement. For example, policies that are applied to a user device are done without explicit user requests. In accordance with this example, the policies are applied in the background even if no user is logged onto the user device. In further accordance with this example, the user device (e.g., an agent thereon) may poll a server for policy on a schedule (e.g., once per hour) or on events (e.g., device wakeup, user unlock, etc.). In further accordance with this example, the server may push the policy to the user device (e.g., an agent thereon) via an open HTTP endpoint.

The system management server(s) 110 are shown to be external to the enterprise 108 for non-limiting, illustrative purposes. For example, a system management service provider may possess or control the system management server(s) 110 and host a system management service that is provided by the selective throttling logic 112 to an entity that possesses and/or controls the admin system 106. In accordance with this example, the entity may subscribe to the system management service. It will be recognized that the system management server(s) 110 may be included in the enterprise 108. For instance, the system management server(s) 110 may be located within an environment of an entity that possesses and/or controls the admin system 106.

In accordance with example embodiments described herein, the selective throttling logic 112 selectively throttles incremental phases of an implementation of configuration changes on respective subsets of the user devices 102A-102M during respective sequential periods of time by performing operations for each subset during a respective phase that precedes a respective next phase of the implementation. The operations include gathering information regarding the phase of the implementation from the user devices in the subset. The operations further include generating a score that indicates an extent to which metrics associated with the implementation are satisfied during the phase based at least in part on the information. The operations further include comparing the score to a reference score for the subset to determine whether the score is within a specified tolerance associated with the reference score. The operations further include selectively throttling the next phase of the implementation based at least in part on whether the score is within the specified tolerance associated with the reference score.

It will be recognized that at least some of the aforementioned functionality may be implemented by the admin system 106, rather than by the selective throttling logic 112. For example, if the administrator does not want to provide information to the system management server(s) 110 and instead wishes to only receive information from the system management server(s) 110, the admin system 106 may gather the information regarding the phase of the implementation from the user devices in the subset. The admin system 106 may generate the score based at least in part on the information. The admin system 106 may compare the score to the reference score for the subset to determine whether the score is within the specified tolerance, or the admin system 106 may provide the score to the system management server(s) 110 for comparison with the reference score for the subset. If the admin system 106 compares the score to the reference score for the subset, the admin system 106 may provide a tolerance indicator to the system management server(s) 110, indicating whether the score is within the specified tolerance.

The selective throttling logic 112 may be implemented in various ways to provide a recommendation of an action in an enterprise, including being implemented in hardware, software, firmware, or any combination thereof. For example, at least a portion of the selective throttling logic 112 may be implemented as computer program code configured to be executed in one or more processors. In another example, at least a portion of the selective throttling logic 112 may be implemented as hardware logic/electrical circuitry. For instance, at least a portion of the selective throttling logic 112 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

The selective throttling logic 112 is shown to be incorporated in the system management server(s) 110 for illustrative purposes and is not intended to be limiting. It will be recognized that the selective throttling logic 112 (or any portion(s) thereof) may be incorporated in the admin system 106 and/or any one or more of the user devices 102A-102M. For example, client-side aspects of the selective throttling logic 112 may be incorporated in the admin system 106 and/or one or more of the user devices 102A-102M, and server-side aspects of the selective throttling logic 112 may be incorporated in the system management server(s) 110.

Figure 2:
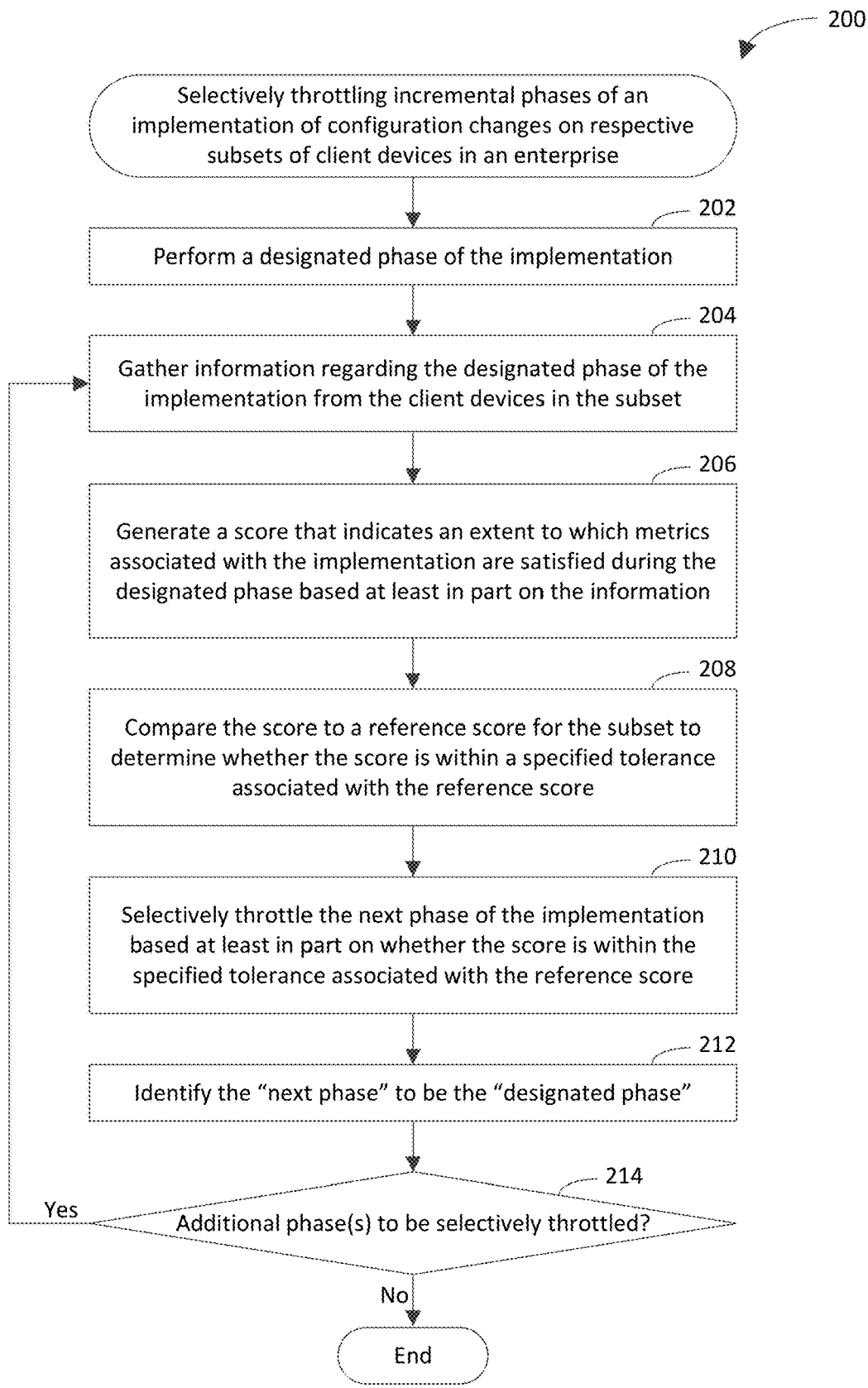
FIG. 2 depicts a flowchart of an example method for selectively throttling incremental phases of an implementation of configuration changes on respective subsets of a plurality of client devices in an enterprise in accordance with an embodiment.
Figure 3:
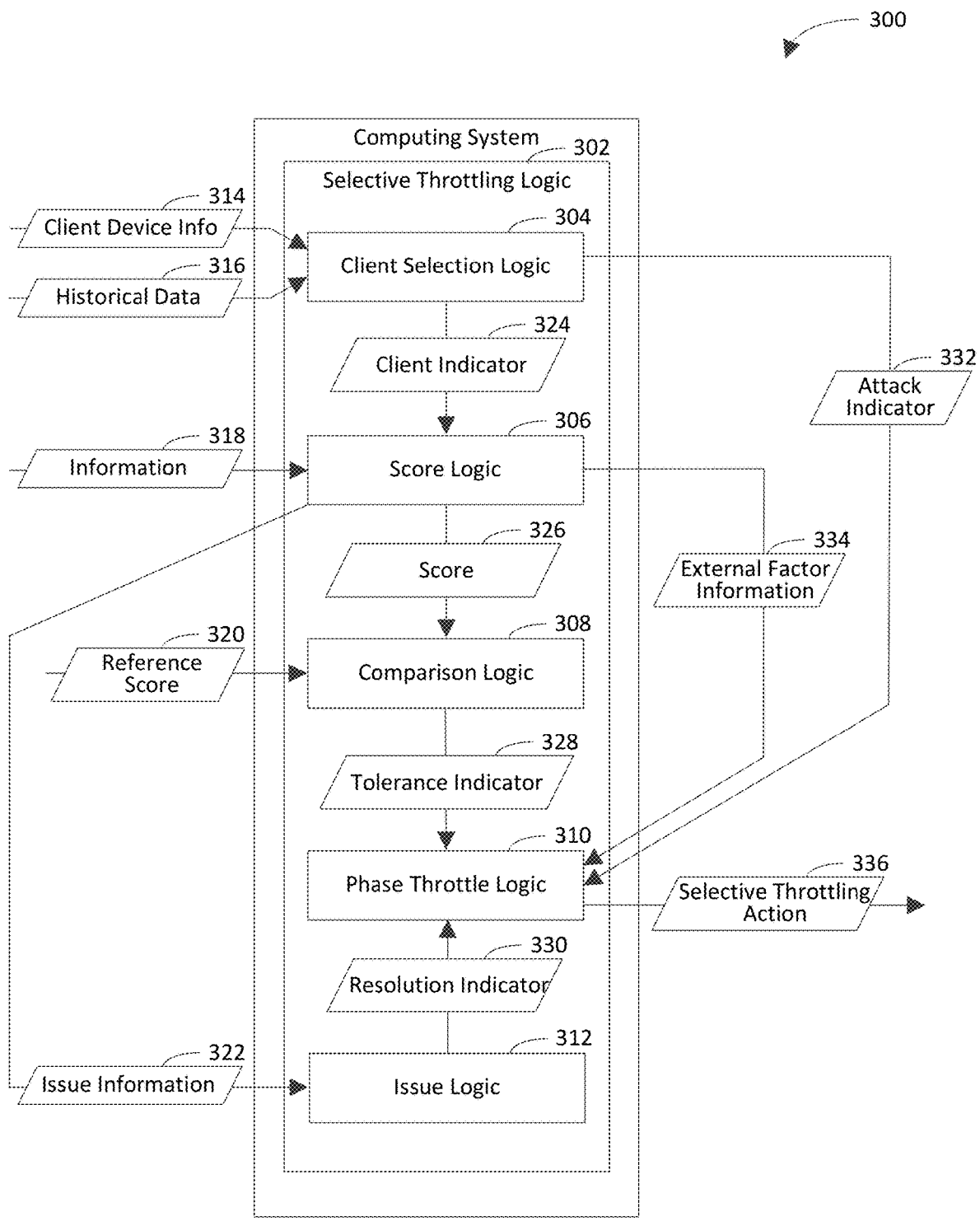
FIG. 3 is a block diagram of an exemplary computing system in accordance with an embodiment.

FIG. 2 depicts a flowchart 200 of an example method for selectively throttling incremental phases of an implementation of configuration changes on respective subsets of a plurality of client devices (e.g., end user devices) in an enterprise in accordance with an embodiment. Examples of an implementation of configuration changes include but are not limited to a deployment of software and enablement of disk encryption. Flowchart 200 may be performed by the system management server(s) 110, the admin system 106, or a combination thereof, shown in FIG. 1, for example. For illustrative purposes, flowchart 200 is described with respect to computing system 300 shown in FIG. 3, which may be an example implementation of the system management server(s) 110, the admin system 106, or a combination thereof. As shown in FIG. 3, the computing system 300 includes selective throttling logic 302. The selective throttling logic 302 includes client selection logic 304, score logic 306, comparison logic 308, phase throttle logic 310, and issue logic 312. Further structural and operational embodiments will be apparent to persons skilled in the relevant art(s) based on the discussion regarding flowchart 200.

As shown in FIG. 2, the method of flowchart 200 begins at step 202. In step 202, a designated phase of the implementation is performed. In an example implementation, the phase throttle logic 310 performed the designated phase of the implementation.

At step 204, information regarding the designated phase of the implementation is gathered from the client devices in the subset. Examples of the information include but are not limited to:

system boot time (including core boot time);
login time;
application startup time (e.g., the time from when an application launches to when the user is able to interact with the application);
total duration and/or number of times a processor utilization exceeds a threshold;
total duration and/or number of times a memory utilization exceeds a threshold;
total duration and/or number of times a memory I/O operation exceeds a threshold;
total duration and/or number of times a network I/O operation exceeds a threshold;

storage utilization;
user device utilization (e.g., the number of hours a user device is on and a user is interacting with the device);
battery utilization and battery warning history;
health indicators: frequency and number of unexpected reboots, anticipated battery life, anticipated hard drive life, frequency and number of driver crashes, frequency and number of application crashes.

Any of the example values mentioned above may be average values and/or may be calculated by phase (i.e., per phase). For instance, any of the example values mentioned above may be calculated based on measurements performed (e.g., only) during the designated phase of the implementation. Any portion of the information may be anonymized or non-anonymized. Information that is anonymized (i.e., anonymized information) does not identify the client device from which the anonymized information is gathered. Accordingly, anonymized information may be incapable of being traced back to the client device from which the anonymized information is gathered. Information that is non-anonymized (i.e., non-anonymized information) identifies the client device from which the non-anonymized information is gathered. Accordingly, non-anonymized information may be capable of being traced back to the client device from which the non-anonymized information is gathered. In an example implementation, the score logic 306 gathers information 318, which includes the information regarding the designated phase of the implementation.

To measure boot time of a client device, boot tracing may be enabled and begin logging events as soon as the operating system (OS) of the client device can do so. Various stages are logged, and these logs are available to measure boot performance of the client device from power-up to the appearance of the login screen. Core boot time is measured as a relatively consistent indicator of performance. Core boot time includes bringing up the OS and loading services. Also, the time between login and execution of the first application to be executed on the client device is measured and collected. Event logs are parsed to ascertain boot time that is specific to hardware of the client device, and so does not include delays introduced by user interaction. In general, core boot time is unaffected by other device customizations, such as installed applications and enterprise IT policy enforcements. However, later boot stages are typically affected by device customizations. Fetching policies (e.g., when a user consent screen is displayed prior to allowing a user to access the client device) can involve network latency, and so is generally not a good measure of the innate performance of the client device. Additionally, OS and application updates may drive widely varying delay times, and so may not be accurate indicators for device characterization. Thus, by performing log parsing, some factors outside the control of the hardware can be omitted from consideration when generating a score as described below with reference to step 206. Login time (i.e., the time from a user entering a password until the user can launch an application) is also gathered.

Applications are also instrumented to determine startup time. The startup time of an application is the time from the user selecting an icon that initiates execution of the application (e.g., by tapping or clicking with a pointing device) and when the application is ready to use. In some examples, this is accomplished efficiently by detecting that a new application window has opened and then determining how long ago the process that spawned the new application window started. Since users typically notice only foreground applications, with which the users interact, application startup time is not measured for some or all background processes, in some examples. Information pertaining to a battery of the client device may indicate (e.g., specify) a number of times a low battery warning is displayed (battery warning history), which indicates whether battery capacity is sufficient for the user. The information pertaining to the battery may indicate how long a user can use client device between charges. Information regarding CPU and memory spikes above thresholds is also gathered, because such incidents are likely noticed by users. In some examples, thresholds of 75% or 80% are used for processor utilization and memory utilization. Storage I/O performance and network I/O performance, such as lag times are collected in some examples. This collected data indicates specific hardware performance, but when combined with or compared with enterprise data, the gathered data can be used to determine whether the performance is acceptable or instead whether improvement is suggested and/or required.

At step 206, a score (a.k.a. user score or user experience score) is generated that indicates an extent to which metrics associated with the implementation are satisfied during the designated phase based at least in part on the information. In an example implementation, the score logic 306 generates a score 326, which indicates the extent to which the metrics associated with the implementation are satisfied during the designated phase based at least in part on the information 318.

In an example embodiment, the score may be generated by performing a weighted calculation on (e.g., a weighted combination of) the information regarding the designated phase of the implementation. For instance, the score may be a weighted average of measurements associated with the respective metrics. A machine learning (ML) algorithm may be executed to determines weights that are to be applied to portions of the information that are associated with the respective metrics based on actual feedback in training data (e.g., key inputs and feedback), such as by matching whether a set of scores matches reported human perceptions regarding whether certain computing devices were operating at acceptable levels of performance. In some examples, a set of rules is used, rather than ML.

A metric is a threshold relating to performance of a client device. Examples of a metric include but are not limited to a maximum boot time; a maximum login time; a maximum application startup time; a maximum duration that processor or memory utilization exceeds a threshold; a maximum number of times that processor or memory utilization exceeds a threshold; a maximum duration that memory or network I/O operation exceeds a threshold; a maximum number of times that memory or network I/O operation exceeds a threshold; a maximum storage utilization; a maximum user device utilization; a maximum battery utilization; a maximum number of times that a battery warning is provided by the client device; a maximum frequency or number of unexpected reboots; a minimum anticipated battery life or hard drive life; a maximum frequency or number of driver crashes; and a maximum frequency or number of application crashes. In some examples, the threshold for processor utilization, memory utilization, storage utilization, user device utilization, and/or battery utilization may be 70%, 75%, 80%, or 85%.

At step 208, the score is compared to a reference score for the subset to determine whether the score is within a specified tolerance associated with the reference score. For example, the specified tolerance may be a range between a first value and a second value. In accordance with this example, the first value is equal to the reference score minus a designated value, and the second value is equal to the reference score plus the designated value.

In an example implementation, the comparison logic 308 compares the score 326 to a reference score 320 to determine whether the score 326 is within the specified tolerance associated with the reference score 326. The score 320 being within the specified tolerance indicates that the next phase of the implementation is not to be throttled. The score not being within the specified tolerance indicates that the next phase of the implementation is to be throttled. The comparison logic 308 may generate a tolerance indicator 328 to indicate whether the score 326 is within the specified tolerance associated with the reference score 320. For instance, the tolerance indicator 328 may indicate an extent to which the score 326 is greater than the reference score 320, an extent to which the score 326 is less than the reference score 320, an extent to which the score 326 is within the specified tolerance, an extent to which the score 326 exceeds the specified tolerance, etc.

At step 210, the next phase of the implementation is selectively throttled based at least in part on whether the score is within the specified tolerance associated with the reference score. In an example implementation, the phase throttle logic 310 selectively throttles the next phase of the implementation based at least in part on whether the score 326 is within the specified tolerance associated with the reference score 320. For example, the phase throttle logic 310 may selectively throttle the next phase of the implementation in response to (based at least in part on) receipt of the tolerance indicator 328. For instance, the phase throttle logic 310 may selectively throttle the next phase of the implementation by performing a selective throttling action 336. The selective throttling action 336 may be throttling the implementation or not throttling the implementation. In accordance with this example, the phase throttle logic 310 may perform the selective throttling action 336 by throttling the next phase of the implementation based at least in part on the tolerance indicator 328 indicating the score 326 is not within the specified tolerance associated with the reference score 320. For example, phase throttle logic 310 may throttle the next phase of the implementation by delaying initiation of the next phase or a portion thereof. In accordance with this example, throttling the next phase may reduce a rate at which the implementation of the configuration changes is performed. In further accordance with this example, the phase throttle logic 310 may perform the selective throttling action 336 by not throttling the next phase of the implementation based at least in part on the tolerance indicator 328 indicating the score 326 is within the specified tolerance associated with the reference score 320.

At step 212, the "next phase" is identified to be the "designated phase". In an example implementation, the score logic 306 identifies the "next phase" to be the "designated phase" so that steps 204, 206, 208, and 210 may be performed with regard to the next phase of the implementation.

At step 214, a determination is made whether additional phase(s) are to be selectively throttled. If additional phase(s) are to be selectively throttled, flow returns to step 204. Otherwise, flowchart 200 ends. In an example implementation, the score logic 306 determines whether additional phase(s) are to be selectively throttled. For example, the score logic 306 may make the determination based at least in part on the information 318. In accordance with this example, the information 318 may indicate on which client devices the configuration changes have been implemented. In further accordance with this example, if the information 318 indicates that the configuration changes have not been implemented on all of the plurality of client devices, the score logic 306 may determine that at least one additional phase is to be selectively throttled. In further accordance with this example, if the information 318 indicates that the configuration changes have been implemented on all of the plurality of client devices, the score logic 306 may determine that no additional phases are to be selectively throttled.

In an example embodiment, the score indicates a user experience of first end users that results from implementation of the configuration changes on the client devices in the subset. In accordance with this embodiment, the first end users are associated with the client devices in the subset. In further accordance with this embodiment, the reference score indicates a user experience of second end users. In further accordance with this embodiment, the second end users are associated with client devices on which the implementation of the configuration changes has not occurred. For instance, the reference score may indicate a user experience of the first end users prior to the implementation of the configuration changes on the client devices in the subset.

In another example embodiment, the next phase of the implementation is throttled at step 210 based at least in part on the score not being within the specified tolerance associated with the reference score.

In yet another example embodiment, the score indicates performance of the client devices in the subset. For instance, the performance of the client devices in the subset may include an amount or a proportion of resources (e.g., processor cycles or processing capacity, memory, network bandwidth) that are consumed by the client devices in the subset. In accordance with this embodiment, the reference score indicates performance of client devices on which the implementation of the configuration changes has not occurred. For instance, the performance of the client devices on which the implementation of the configuration changes has not occurred may include an amount or a proportion of resources that are consumed by those client devices.

In still another example embodiment, the score indicates a security posture (a.k.a. security status) of the client devices in the subset. The security posture of a client device indicates how secure hardware that is included in the client device, software that is deployed on the client device, a network to which the client device is connected, and/or information stored on the client device is. The security posture of a client device may indicate an ability of the client device to withstand a cybersecurity threat. For instance, the aforementioned security posture may indicate an extent to which the client device may predict, prevent, and/or respond to a cyberthreat. The security posture of a client device may indicate an extent to which the client device poses a risk to cybersecurity of the enterprise. In accordance with this embodiment, the reference score indicates a security posture of client devices on which the implementation of the configuration changes has not occurred.

In some example embodiments, one or more steps 202, 204, 206, 208, 210, 212, and/or 214 of flowchart 200 may not be performed. Moreover, steps in addition to or in lieu of steps 202, 204, 206, 208, 210, 212, and/or 214 may be performed. For instance, in an example embodiment, the method of flowchart 200 further includes automatically selecting groups of client devices in the enterprise on which to implement respective incremental portions of an enterprise-wide implementation of the configuration changes based at least in part on each group being a statistically representative sample of an entirety of the client devices in the enterprise. It will be recognized that the groups may be automatically selected based on other factor(s) in addition to or in lieu of each of the groups being a statistically representative sample of the entirety of the client devices in the enterprise. In an example implementation, the client selection logic 304 automatically selects the groups of client devices. For instance, the client selection logic 304 may analyze client device information 314, which includes information about the client devices in the enterprise to determine which combinations of the client devices constitute statistically representative samples of the entirety of the client devices in the enterprise. The client selection logic 304 may automatically select the groups based on (e.g., based at least in part on) the analysis of the client device information 314. In accordance with this embodiment, a difference between attributes of each statistically representative sample and attributes of the entirety of the client devices in the enterprise is within a designated statistical tolerance. In further accordance with this embodiment, a first group includes the plurality of client devices. In further accordance with this embodiment, a first portion of the enterprise-wide implementation of the configuration changes includes the incremental phases of the implementation of the configuration changes on the respective subsets of the plurality of client devices.

In another example embodiment, the method of flowchart 200 further includes automatically selecting groups of client devices in the enterprise on which to implement respective incremental portions of an enterprise-wide implementation of the configuration changes based at least in part on the client devices in each group having a common attribute. For instance, the client devices in each group may be in a same geographical region (e.g., same city, state, or building); be from a same manufacturer; have a same model number; have a same software configuration; have a same hardware configuration, and so on. In an example implementation, the client selection logic 304 automatically selects the groups of client devices. For instance, the client selection logic 304 may analyze client device information 314, which includes information about the client devices in the enterprise to determine which combinations of the client devices have at least one common attribute. The client selection logic 304 may automatically select the groups based on the analysis of the client device information 314. In accordance with this embodiment, a first group includes the plurality of client devices. In further accordance with this embodiment, a first portion of the enterprise-wide implementation of the configuration changes includes the incremental phases of the implementation of the configuration changes on the respective subsets of the plurality of client devices.

In yet another example embodiment, the method of flowchart 200 further includes analyzing historical data to determine an amount of time that end users have historically taken to authorize implementation of configuration changes on their client devices in response to receipt of a solicitation to authorize the implementation. In an example implementation, the client selection logic 304 analyzes historical data 316 to determine the amount of time that the end users have historically taken to authorize implementation of configuration changes on their client devices. For instance, the client selection logic 304 may monitor a time period between a time instance at which each solicitation is provided to each client device and a time instance at which the respective client device authorizes the solicited implementation. The client selection logic 304 may store a log of these time periods in the historical data 316. In accordance with this embodiment, the method of flowchart 200 further includes automatically selecting groups of client devices in the enterprise on which to implement respective incremental portions of an enterprise-wide implementation of the configuration changes based at least in part on the amount of time that the end users have historically taken to authorize implementation of configuration changes on their client devices in response to receipt of a solicitation to authorize the implementation. In an aspect of this embodiment, client devices of end users who historically have taken a relatively lesser amount of time to authorize implementation may be automatically selected to be included in initial group(s), wherein incremental portion(s) of the enterprise-wide implementation that correspond to the initial group(s) are to be performed prior to the other incremental portions of the enterprise-wide implementation.

The groups of the client devices are described above as being automatically selected for illustrative purposes and are not intended to be limiting. It will be recognized that an administrator of the enterprise may manually select one or more (e.g., all) of the groups of the client devices in the enterprise on which to implement the respective incremental portions of the enterprise-wide implementation.

In still another example embodiment, the method of flowchart 200 further includes determining that an external factor, which is not a result of implementing the configuration changes, negatively impacts the score. In an example implementation, the score logic 306 determines that the external factor negatively impacts the score. For instance, the score logic 306 may perform a statistical analysis on a variety of factors, including the external factor, to determine an extent to which each factor contributed to the score. The score logic 306 may determine that the external factor negatively impacts the score based on the statistical analysis. In accordance with this embodiment, comparing the score to the reference score at step 208 includes determining that the score is not within the specified tolerance associated with the reference score. In further accordance with this embodiment, selectively throttling the next phase of the implementation at step 210 includes not throttling the next phase of the implementation, even though the score is not within the specified tolerance associated with the reference score, based at least in part on the external factor negatively impacting the score.

In an aspect of this embodiment, determining that the external factor negatively impacts the score includes determining an extent to which the external factor negatively impacts the score. In accordance with this aspect, determining that the score is not within the specified tolerance associated with the reference score includes determining an extent to which the score exceeds the specified tolerance. In further accordance with this embodiment, not throttling the next phase of the implementation includes not throttling the next phase of the implementation based at least in part on the extent to which the external factor negatively impacts the score being greater than or equal to the extent to which the score exceeds the specified tolerance.

In another example embodiment, for each client device in the enterprise, a likelihood that the client device is to be attacked with malware is determined. For example, the client selection logic 304 may determine, for each client device in the enterprise, the likelihood that the client device will be attacked with malware. In accordance with this example, the client selection logic 304 may determine the likelihood for each client device by analyzing the client device information 314, which may indicate vulnerabilities of the client devices to malware attacks, security software that is deployed on the client devices, etc. The client selection logic 304 may generate an attack indicator 332 to indicate the likelihood that each device in the enterprise is to be attacked with malware. In further accordance with this embodiment, selectively throttling the next phase of the implementation at step 210 includes selectively throttling the next phase of the implementation further based at least in part on the likelihoods that the respective client devices in the subset are to be attacked with malware. For example, a relatively higher likelihood that a client device is to be attacked with malware weighs in favor of throttling the next phase of the implementation; whereas, a relatively lesser likelihood that a client device is to be attacked with malware weighs against throttling the next phase of the implementation. In another example, the implementation of the configuration changes may be a deployment or update of security software (e.g., Bitlocker®, which is developed and distributed by Microsoft Corporation). It will be recognized that the next phase of the implementation may be selectively throttled based on any combination of factors (i.e., not just those described).

In yet another example embodiment, comparing the score to the reference score at step 208 includes determining that the score is not within the specified tolerance associated with the reference score. In accordance with this embodiment, the method of flowchart 200 further includes identifying a source of an issue that causes the score to not be within the specified tolerance associated with the reference score. In an example implementation, the score logic 306 identifies the source of the issue. For instance, the user logic 306 may identify the source of the issue by analyzing the information 318. In accordance with this implementation, the score logic 306 may generate issue information 322 to indicate the source of the issue. In further accordance with this embodiment, the method of flowchart 200 further includes resolving the issue in response to identifying the source of the issue. In an example implementation, the issue logic 312 resolves the issue. For example, the issue logic 312 may resolve the issue in response to receipt of the issue information 322 (e.g., based at least in part on the issue information 322 indicating the source of the issue. In another example, the issue logic 312 may resolve the issue by modifying the configuration changes so that the issue no longer occurs. In further accordance with this embodiment, selectively throttling the next phase of the implementation at step 210 includes performing the next phase of the implementation in response to the issue being resolved.

In an aspect of this embodiment, the method of flowchart 200 further includes providing troubleshooting information to an administrator of the enterprise. The troubleshooting information indicates step(s) to be performed to resolve the issue. In accordance with this aspect, resolving the issue includes resolving the issue by performing the step(s) based at least in part on instructions that are received from the administrator. The instructions trigger performance of the step(s).

In still another example embodiment, comparing the score to the reference score at step 208 includes determining that the score is not within the specified tolerance associated with the reference score. In accordance with this embodiment, the method of flowchart 200 further includes notifying an administrator of the enterprise that the next phase of the implementation of the configuration changes is likely to negatively impact a user experience of users of the respective subset of computing devices, based at least in part on the score not being within the specified tolerance associated with the reference score. In an example implementation, the phase throttle logic 310 notifies the administrator of the enterprise that the next phase of the implementation of the configuration changes is likely to negatively impact the user experience of the users of the respective subset of computing devices, based at least in part on the tolerance indicator 328 indicating that the score is not within the specified tolerance associated with the reference score 320. It should be noted that the administrator may initiate performance of the next phase of the implementation of the configuration changes despite being notified that the next phase of the implementation of the configuration changes is likely to negatively impact the user experience of the users of the respective subset of computing devices.

It will be recognized that the computing system 300 may not include one or more of the selective throttling logic 302, the client selection logic 304, the score logic 306, the comparison logic 308, the phase throttle logic 310, and/or the issue logic 312. Furthermore, the computing system 300 may include components in addition to or in lieu of the selective throttling logic 302, the client selection logic 304, the score logic 306, the comparison logic 308, the phase throttle logic 310, and/or the issue logic 312.

Figure 4:
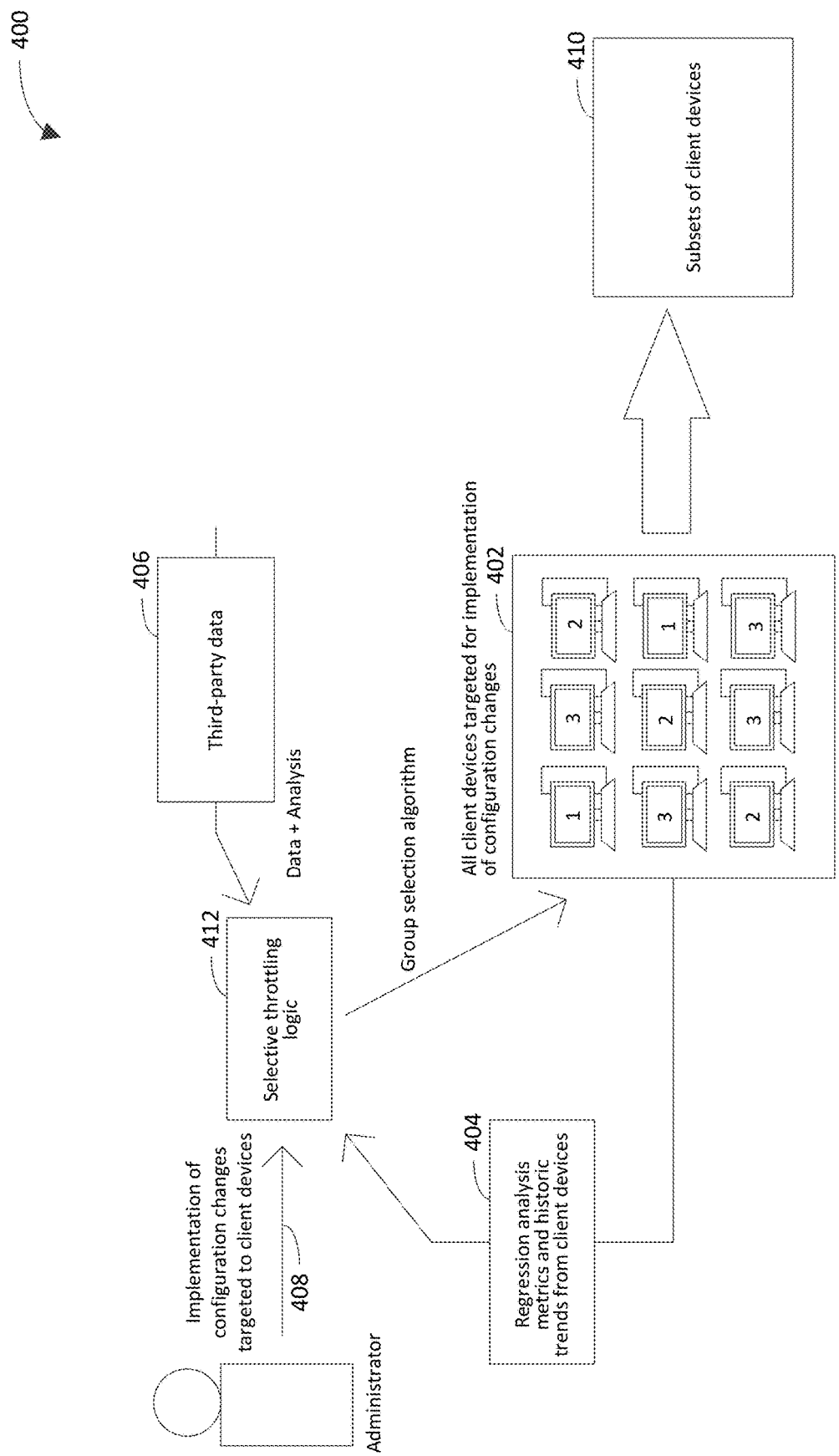
FIG. 4 is a diagram illustrating an example selection of subsets of client devices for respective incremental phases of an implementation of configuration changes in accordance with an embodiment.

FIG. 4 is a diagram 400 illustrating an example selection of subsets of client devices for respective incremental phases of an implementation of configuration changes in accordance with an embodiment. When an administrator kicks off software deployments, as illustrated by arrow 408, selective throttling logic 412 automatically determines an group of client devices 402 to which an implementation of configuration changes may be pushed in phases. The selective throttling logic 412 determines subsets of client devices 410 for respective phases of the implementation. The subsets may be created by taking into account predictive user scores associated with the client devices 402 where applicable. For instance, the selective throttling logic 412 may repeat selection of a subset of the client devices in the group in future iterations if a regression occurs based on the initial implementation. The subset may include the statistically most desirable client devices and configurations for the implementation. For example, the selective throttling logic 412 may analyze regression analysis metrics and historic trends 404 from the client devices 402 and/or third-party data 406 to identify the most desirable client devices and configurations for the implementation. The selective throttling logic 412 may provide an indication of one or more of the subsets to the administrator if there is a foreseeable problem.

Figure 5:
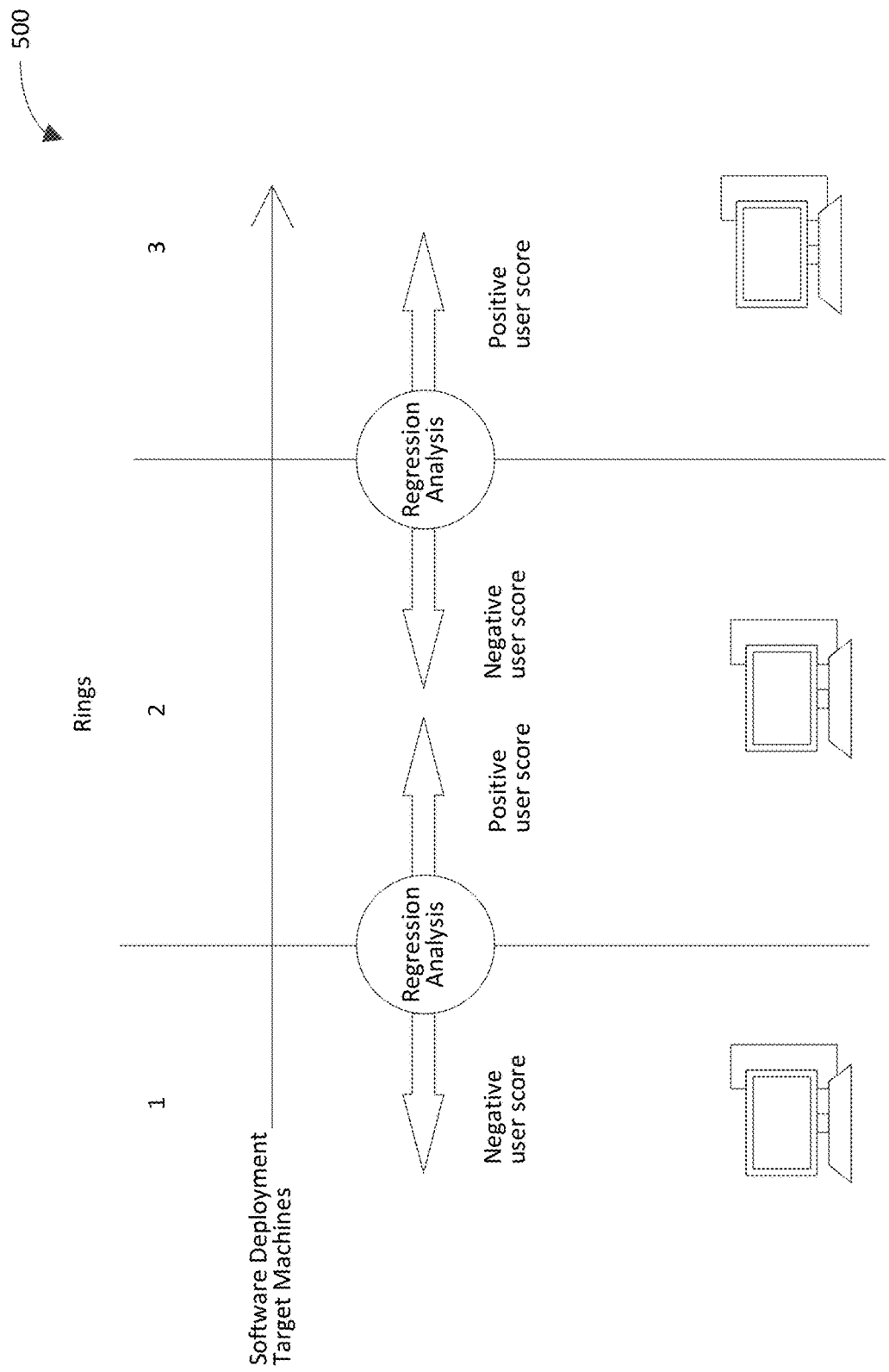
FIGS. 5 and 6 are diagrams illustrating performance of an example automatic regression analysis technique with regard to subsets of client devices that are included in a common group and that correspond to respective phases of an implementation of configuration changes in accordance with an embodiment.
Figure 6:
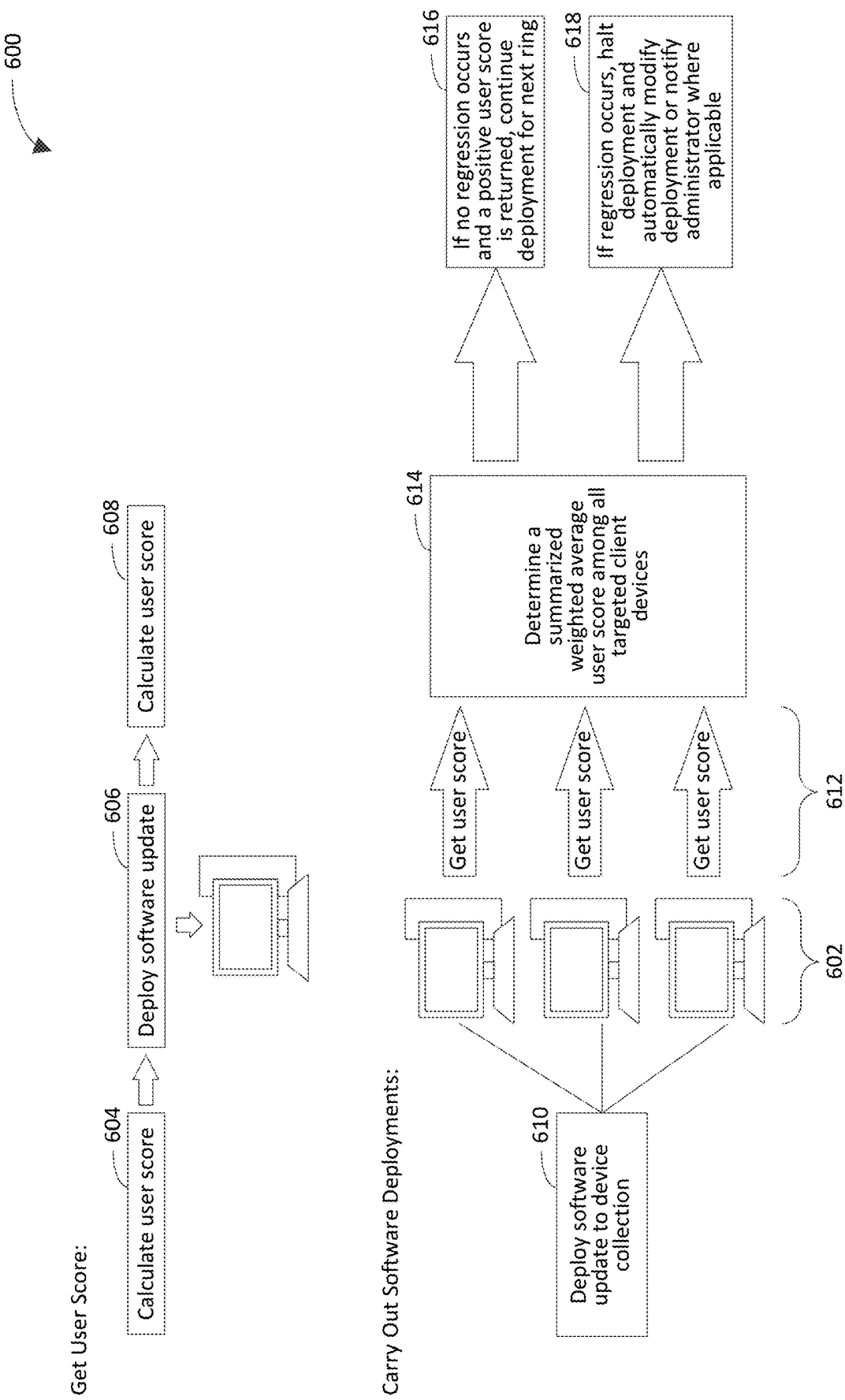

FIGS. 5 and 6 are diagrams 500 and 600 illustrating performance of an example automatic regression analysis technique with regard to subsets (e.g., rings) of client devices that are included in a common group and that correspond to respective phases of an implementation of configuration changes in accordance with an embodiment. Referring to FIG. 5, if a net negative score is created from the regression analysis, rather than continuing to deploy, the source of the issue may be detected, the predicted degradation is determined, and the source and the predicted degradation may be reported to the administrator so that the administrator may take action to remedy the issue. Alternatively, an automated system may improve the implementation of the configuration changes (e.g., by reducing a number and/or severity of issues associated with the implementation), iterate based on findings of a first implementation, and try a modification of the implementation with a new series of subsets of client devices. This may lead to a statistically most desirable experience for the end user and the administrator.

Referring to FIG. 6, a phase of an implementation of configuration changes may be performed, and a determination may be made as to whether the phase experienced a regression on the score of affected devices. For instance, the user score may be calculated 604 prior to deployment of a software updated, the software updated may be deployed 606, and the user score may be recalculated 608 after completion of the deployment of the software update to determine whether the phase experienced a regression on the user score. If no regression exists, the implantation may progress forward to the next subset of client devices. Otherwise, throttling of the implementation may occur, so that the implementation may be modified, and the implementation may be un-throttled with optimized changes to get a positive score. For instance, when a software update is deployed 610 to client devices 602, user scores associated with the respective client devices 602 may be gathered to determine 614 a summarized weighted average user score among all targeted client devices. For instance, the user scores associated with the respective client devices 602 may be weighted and averaged to determine the summarized weighted average user score. If no regression occurs and a positive user score is returned, deployment may be continued 616 for the next ring of client devices. If regression occurs, deployment may be halted 618, and the deployment may be modified or the administrator may be notified where applicable.

FIG. 7 shows example pseudocode 700 for calculating (e.g., determining) a score for one or more devices (e.g., one or more user devices) in accordance with an embodiment. For instance, a score may represent user experience on a particular device. In some examples, scores range from 0 and 100, with 100 being the best experience, and 0 being the worst. For example, if startup time is above average (e.g., longer than an average startup time on the particular device), the user may perceive a poor experience, whereas, a faster-than-average startup time will provide the user with a better experience. The pseudocode 700 may rely on normalized metrics data (e.g., when the collected information is converted into metric data, "better" values are converted into lower metric numbers). In some examples, the metric data includes instance data for particular devices (e.g., core boot time is 5 seconds); global means (e.g., average core boot time is 10 seconds); and global standard deviation (e.g., the standard deviation of boot times for all devices is 2.1 seconds). Weights that are applied to the metric data indicate the significance of a metric for users' perceptions of the experiences with the devices. In some example calculations, the weights sum to 1.0. For example, with three metrics, the weights may be boot time=0.1, application start time=0.4, and battery life=0.5.

The specific calculation is shown in pseudocode 700 and repeated below. The ue_score is the user score or user experience score.

ue_score=0;
for each metric
{
    z_score=min(5, max(-5,(instance-mean)/standard deviation));
    metric_value=(-1*<z_score>+5/10);
    ue_score+=metric_value*metric_weight;
}
next metric;
return ue_score;

Some examples use alternative calculations of scores. For example, instead of a linear association between z-score and user experience (ue_score), an exponential relationship may be used (e.g., twice as slow worsens the score by a factor of four). In another example, an expectation of a time (boot time or application startup time), rather than a calculated mean, may be used. Using an expectation of time would reduce scores for computing devices that took longer than a user's expectation to perform a task, even if the particular computing device is performing at an above-average speed. Other variations are also possible.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the selective throttling logic 112, the selective throttling logic 302, the client selection logic 304, the score logic 306, the comparison logic 308, the phase throttle logic 310, the issue logic 312, the selective throttling logic 412, and/or flowchart 200 may be implemented in hardware, software, firmware, or any combination thereof.

For example, any one or more of the selective throttling logic 112, the selective throttling logic 302, the client selection logic 304, the score logic 306, the comparison logic 308, the phase throttle logic 310, the issue logic 312, the selective throttling logic 412, and/or flowchart 200 may be implemented, at least in part, as computer program code configured to be executed in one or more processors.

In another example, any one or more of the selective throttling logic 112, the selective throttling logic 302, the client selection logic 304, the score logic 306, the comparison logic 308, the phase throttle logic 310, the issue logic 312, the selective throttling logic 412, and/or flowchart 200 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example system comprises a memory and one or more processors coupled to the memory. The one or more processors are configured to selectively throttle incremental phases of an implementation of configuration changes on respective subsets of a plurality of client devices in an enterprise during respective sequential periods of time by performing operations for each subset during a respective phase that precedes a respective next phase of the implementation. The operations comprise gather information regarding the phase of the implementation from the client devices in the subset. The operations further comprise generate a score that indicates an extent to which metrics associated with the implementation are satisfied during the phase based at least in part on the information. The operations further comprise compare the score to a reference score for the subset to determine whether the score is within a specified tolerance associated with the reference score. The operations further comprise selectively throttle the next phase of the implementation based at least in part on whether the score is within the specified tolerance associated with the reference score.

In a first aspect of the example system, the one or more processors are configured to perform the operations further comprising automatically select a plurality of groups of client devices in the enterprise on which to implement a plurality of respective incremental portions of an enterprise-wide implementation of the configuration changes based at least in part on each group being a statistically representative sample of an entirety of the client devices in the enterprise. A difference between attributes of each statistically representative sample and attributes of the entirety of the client devices in the enterprise is within a designated statistical tolerance. In accordance with the first aspect, a first group of the plurality of groups includes the plurality of client devices. In further accordance with the first aspect, a first portion of the enterprise-wide implementation of the configuration changes includes the incremental phases of the implementation of the configuration changes on the respective subsets of the plurality of client devices.

In a second aspect of the example system, the one or more processors are configured to perform the operations further comprising automatically select a plurality of groups of client devices in the enterprise on which to implement a plurality of respective incremental portions of an enterprise-wide implementation of the configuration changes based at least in part on the client devices in each group having a common attribute. In accordance with the second aspect, a first group of the plurality of groups includes the plurality of client devices. In further accordance with the second aspect, a first portion of the enterprise-wide implementation of the configuration changes includes the incremental phases of the implementation of the configuration changes on the respective subsets of the plurality of client devices. The second aspect of the example system may be implemented in combination with the first aspect of the example system, though the example embodiments are not limited in this respect.

In a third aspect of the example system, the one or more processors are configured to perform the operations further comprising analyze historical data to determine an amount of time that end users have historically taken to authorize implementation of configuration changes on their client devices in response to receipt of a solicitation to authorize the implementation. In accordance with the third aspect, the one or more processors are configured to perform the operations further comprising automatically select a plurality of groups of client devices in the enterprise on which to implement a plurality of respective incremental portions of an enterprise-wide implementation of the configuration changes based at least in part on the amount of time that the end users have historically taken to authorize implementation of configuration changes on their client devices in response to receipt of a solicitation to authorize the implementation. The third aspect of the example system may be implemented in combination with the first and/or second aspect of the example system, though the example embodiments are not limited in this respect.

In a fourth aspect of the example system, the score indicates a user experience of a first plurality of end users that results from implementation of the configuration changes on the client devices in the subset. In accordance with the fourth aspect, the first plurality of end users is associated with the client devices in the subset. In further accordance with the fourth aspect, the reference score indicates a user experience of a second plurality of end users. In further accordance with the third aspect, the second plurality of end users is associated with client devices on which the implementation of the configuration changes has not occurred. The fourth aspect of the example system may be implemented in combination with the first, second, and/or third aspect of the example system, though the example embodiments are not limited in this respect.

In an implementation of the fourth aspect of the example system, the reference score indicates a user experience of the first plurality of end users prior to the implementation of the configuration changes on the client devices in the subset.

In a fifth aspect of the example system, the score indicates performance of the client devices in the subset. In accordance with the fifth aspect, the reference score indicates performance of client devices on which the implementation of the configuration changes has not occurred. The fifth aspect of the example system may be implemented in combination with the first, second, third, and/or fourth aspect of the example system, though the example embodiments are not limited in this respect.

In a sixth aspect of the example system, the score indicates a security posture of the client devices in the subset. In accordance with the sixth aspect, the reference score indicates a security posture of client devices on which the implementation of the configuration changes has not occurred. The sixth aspect of the example system may be implemented in combination with the first, second, third, fourth, and/or fifth aspect of the example system, though the example embodiments are not limited in this respect.

In a seventh aspect of the example system, the one or more processors are configured to perform the operations comprising throttle the next phase of the implementation based at least in part on the score not being within the specified tolerance associated with the reference score. The seventh aspect of the example system may be implemented in combination with the first, second, third, fourth, fifth, and/or sixth aspect of the example system, though the example embodiments are not limited in this respect.

In an eighth aspect of the example system, the one or more processors are configured to perform the operations comprising determine that an external factor, which is not a result of implementing the configuration changes, negatively impacts the score. In accordance with the eighth aspect, the one or more processors are configured to perform the operations comprising determine that the score is not within the specified tolerance associated with the reference score. In further accordance with the eighth aspect, the one or more processors are configured to perform the operations comprising not throttle the next phase of the implementation, even though the score is not within the specified tolerance associated with the reference score, based at least in part on the external factor negatively impacting the score. The eighth aspect of the example system may be implemented in combination with the first, second, third, fourth, fifth, sixth, and/or seventh aspect of the example system, though the example embodiments are not limited in this respect.

In a ninth aspect of the example system, the one or more processors are configured to perform the operations comprising selectively throttle incremental phases of a deployment of software on the respective subsets of the client devices. The ninth aspect of the example system may be implemented in combination with the first, second, third, fourth, fifth, sixth, seventh, and/or eighth aspect of the example system, though the example embodiments are not limited in this respect.

In a tenth aspect of the example system, the one or more processors are configured to perform the operations comprising selectively throttle incremental phases of enabling disk encryption on the respective subsets of the client devices. The tenth aspect of the example system may be implemented in combination with the first, second, third, fourth, fifth, sixth, seventh, eighth, and/or ninth aspect of the example system, though the example embodiments are not limited in this respect.

In an eleventh aspect of the example system, the one or more processors are configured to perform the operations comprising, for each client device in the enterprise, determine a likelihood that the client device is to be attacked with malware. In accordance with the eleventh aspect, the one or more processors are configured to perform the operations comprising selectively throttle the next phase of the implementation further based at least in part on the likelihoods that the respective client devices in the subset are to be attacked with malware. The eleventh aspect of the example system may be implemented in combination with the first, second, third, fourth, fifth, sixth, seventh, eighth, ninth, and/or tenth aspect of the example system, though the example embodiments are not limited in this respect.

In a twelfth aspect of the example system, the one or more processors are configured to perform the operations comprising determine that the score is not within the specified tolerance associated with the reference score; identify a source of an issue that causes the score to not be within the specified tolerance associated with the reference score; resolve the issue in response to identifying the source of the issue; and perform the next phase of the implementation in response to the issue being resolved. The twelfth aspect of the example system may be implemented in combination with the first, second, third, fourth, fifth, sixth, seventh, eighth, ninth, tenth, and/or eleventh aspect of the example system, though the example embodiments are not limited in this respect.

In a thirteenth aspect of the example system, the one or more processors are configured to perform the operations further comprising determine that the score is not within the specified tolerance associated with the reference score. In accordance with the thirteenth aspect, the one or more processors are configured to perform the operations further comprising notify an administrator of the enterprise that the next phase of the implementation of the configuration changes is likely to negatively impact a user experience of users of the respective subset of computing devices, based at least in part on the score not being within the specified tolerance associated with the reference score. The thirteenth aspect of the example system may be implemented in combination with the first, second, third, fourth, fifth, sixth, seventh, eighth, ninth, tenth, eleventh, and/or twelfth aspect of the example system, though the example embodiments are not limited in this respect.

In an example method, incremental phases of an implementation of configuration changes on respective subsets of a plurality of client devices in an enterprise are incrementally throttled during respective sequential periods of time by performing operations for each subset during a respective phase that precedes a respective next phase of the implementation. The operations comprise gathering information regarding the phase of the implementation from the client devices in the subset. The operations further comprise generating a score that indicates an extent to which metrics associated with the implementation are satisfied during the phase based at least in part on the information. The operations further comprise comparing the score to a reference score for the subset to determine whether the score is within a specified tolerance associated with the reference score. The operations further comprise selectively throttling the next phase of the implementation based at least in part on whether the score is within the specified tolerance associated with the reference score.

In a first aspect of the example method, the example method further comprises automatically selecting a plurality of groups of client devices in the enterprise on which to implement a plurality of respective incremental portions of an enterprise-wide implementation of the configuration changes based at least in part on each group being a statistically representative sample of an entirety of the client devices in the enterprise. A difference between attributes of each statistically representative sample and attributes of the entirety of the client devices in the enterprise is within a designated statistical tolerance. In accordance with the first aspect, a first group of the plurality of groups includes the plurality of client devices. In further accordance with the first aspect, a first portion of the enterprise-wide implementation of the configuration changes includes the incremental phases of the implementation of the configuration changes on the respective subsets of the plurality of client devices.

In a second aspect of the example method, the example method further comprises automatically selecting a plurality of groups of client devices in the enterprise on which to implement a plurality of respective incremental portions of an enterprise-wide implementation of the configuration changes based at least in part on the client devices in each group having a common attribute. In accordance with the second aspect, a first group of the plurality of groups includes the plurality of client devices. In further accordance with the second aspect, a first portion of the enterprise-wide implementation of the configuration changes includes the incremental phases of the implementation of the configuration changes on the respective subsets of the plurality of client devices. The second aspect of the example method may be implemented in combination with the first aspect of the example method, though the example embodiments are not limited in this respect.

In a third aspect of the example method, the example method further comprises analyzing historical data to determine an amount of time that end users have historically taken to authorize implementation of configuration changes on their client devices in response to receipt of a solicitation to authorize the implementation. In accordance with the third aspect, the example method further comprises automatically selecting a plurality of groups of client devices in the enterprise on which to implement a plurality of respective incremental portions of an enterprise-wide implementation of the configuration changes based at least in part on the amount of time that the end users have historically taken to authorize implementation of configuration changes on their client devices in response to receipt of a solicitation to authorize the implementation. The third aspect of the example method may be implemented in combination with the first and/or second aspect of the example method, though the example embodiments are not limited in this respect.

In a fourth aspect of the example method, the score indicates a user experience of a first plurality of end users that results from implementation of the configuration changes on the client devices in the subset. In accordance with the fourth aspect, the first plurality of end users is associated with the client devices in the subset. In further accordance with the fourth aspect, the reference score indicates a user experience of a second plurality of end users. In further accordance with the fourth aspect, the second plurality of end users is associated with client devices on which the implementation of the configuration changes has not occurred. The fourth aspect of the example method may be implemented in combination with the first, second, and/or third aspect of the example method, though the example embodiments are not limited in this respect.

In an implementation of the fourth aspect of the example method, the reference score indicates a user experience of the first plurality of end users prior to the implementation of the configuration changes on the client devices in the subset.

In a fifth aspect of the example method, the score indicates performance of the client devices in the subset. In accordance with the fifth aspect, the reference score indicates performance of client devices on which the implementation of the configuration changes has not occurred. The fifth aspect of the example method may be implemented in combination with the first, second, third, and/or fourth aspect of the example method, though the example embodiments are not limited in this respect.

In a sixth aspect of the example method, the score indicates a security posture of the client devices in the subset. In accordance with the sixth aspect, the reference score indicates a security posture of client devices on which the implementation of the configuration changes has not occurred. The sixth aspect of the example method may be implemented in combination with the first, second, third, fourth, and/or fifth aspect of the example method, though the example embodiments are not limited in this respect.

In a seventh aspect of the example method, selectively throttling the incremental phases of the implementation of the configuration changes on the respective subsets of the client devices comprises throttling the next phase of the implementation based at least in part on the score not being within the specified tolerance associated with the reference score. The seventh aspect of the example method may be implemented in combination with the first, second, third, fourth, fifth, and/or sixth aspect of the example method, though the example embodiments are not limited in this respect.

In an eighth aspect of the example method, the example method further comprises determining that an external factor, which is not a result of implementing the configuration changes, negatively impacts the score. In accordance with the eighth aspect, comparing the score to the reference score for the subset comprises determining that the score is not within the specified tolerance associated with the reference score. In further accordance with the eighth aspect, selectively throttling the next phase of the implementation comprises not throttling the next phase of the implementation, even though the score is not within the specified tolerance associated with the reference score, based at least in part on the external factor negatively impacting the score. The eighth aspect of the example method may be implemented in combination with the first, second, third, fourth, fifth, sixth, and/or seventh aspect of the example method, though the example embodiments are not limited in this respect.

In a ninth aspect of the example method, selectively throttling the incremental phases of the implementation of the configuration changes on the respective subsets of the client devices comprises selectively throttling incremental phases of a deployment of software on the respective subsets of the client devices. The ninth aspect of the example method may be implemented in combination with the first, second, third, fourth, fifth, sixth, seventh, and/or eighth aspect of the example method, though the example embodiments are not limited in this respect.

In a tenth aspect of the example method, selectively throttling the incremental phases of the implementation of the configuration changes on the respective subsets of the client devices comprises selectively throttling incremental phases of enabling disk encryption on the respective subsets of the client devices. The tenth aspect of the example method may be implemented in combination with the first, second, third, fourth, fifth, sixth, seventh, eighth, and/or ninth aspect of the example method, though the example embodiments are not limited in this respect.

In an eleventh aspect of the example method, the example method further comprises, for each client device in the enterprise, determining a likelihood that the client device is to be attacked with malware. In accordance with the eleventh aspect, selectively throttling the next phase of the implementation comprises selectively throttling the next phase of the implementation further based at least in part on the likelihoods that the respective client devices in the subset are to be attacked with malware. The eleventh aspect of the example method may be implemented in combination with the first, second, third, fourth, fifth, sixth, seventh, eighth, ninth, and/or tenth aspect of the example method, though the example embodiments are not limited in this respect.

In a twelfth aspect of the example method, comparing the score to the reference score for the subset comprises determining that the score is not within the specified tolerance associated with the reference score. In accordance with the twelfth aspect, the example method further comprises: identifying a source of an issue that causes the score to not be within the specified tolerance associated with the reference score; and resolving the issue in response to identifying the source of the issue. In further accordance with the twelfth aspect, selectively throttling the next phase of the implementation comprises performing the next phase of the implementation in response to the issue being resolved. The twelfth aspect of the example method may be implemented in combination with the first, second, third, fourth, fifth, sixth, seventh, eighth, ninth, tenth, and/or eleventh aspect of the example method, though the example embodiments are not limited in this respect.

In a thirteenth aspect of the example method, comparing the score to the reference score for the subset comprises determining that the score is not within the specified tolerance associated with the reference score. In accordance with the thirteenth aspect, the example method further comprises notifying an administrator of the enterprise that the next phase of the implementation of the configuration changes is likely to negatively impact a user experience of users of the respective subset of computing devices, based at least in part on the score not being within the specified tolerance associated with the reference score. The thirteenth aspect of the example method may be implemented in combination with the first, second, third, fourth, fifth, sixth, seventh, eighth, ninth, tenth, eleventh, and/or twelfth aspect of the example method, though the example embodiments are not limited in this respect.

An example computer program product comprises a computer-readable storage medium having instructions recorded thereon for enabling a processor-based system to perform operations. The operations comprise selectively throttle incremental phases of an implementation of configuration changes on respective subsets of a plurality of client devices in an enterprise during respective sequential periods of time by performing actions for each subset during a respective phase that precedes a respective next phase of the implementation. The actions comprise: gather information regarding the phase of the implementation from the client devices in the subset; generate a score that indicates an extent to which metrics associated with the implementation are satisfied during the phase based at least in part on the information; compare the score to a reference score for the subset to determine whether the score is within a specified tolerance associated with the reference score; and selectively throttle the next phase of the implementation based at least in part on whether the score is within the specified tolerance associated with the reference score.

IV. Example Computer System

Figure 8:
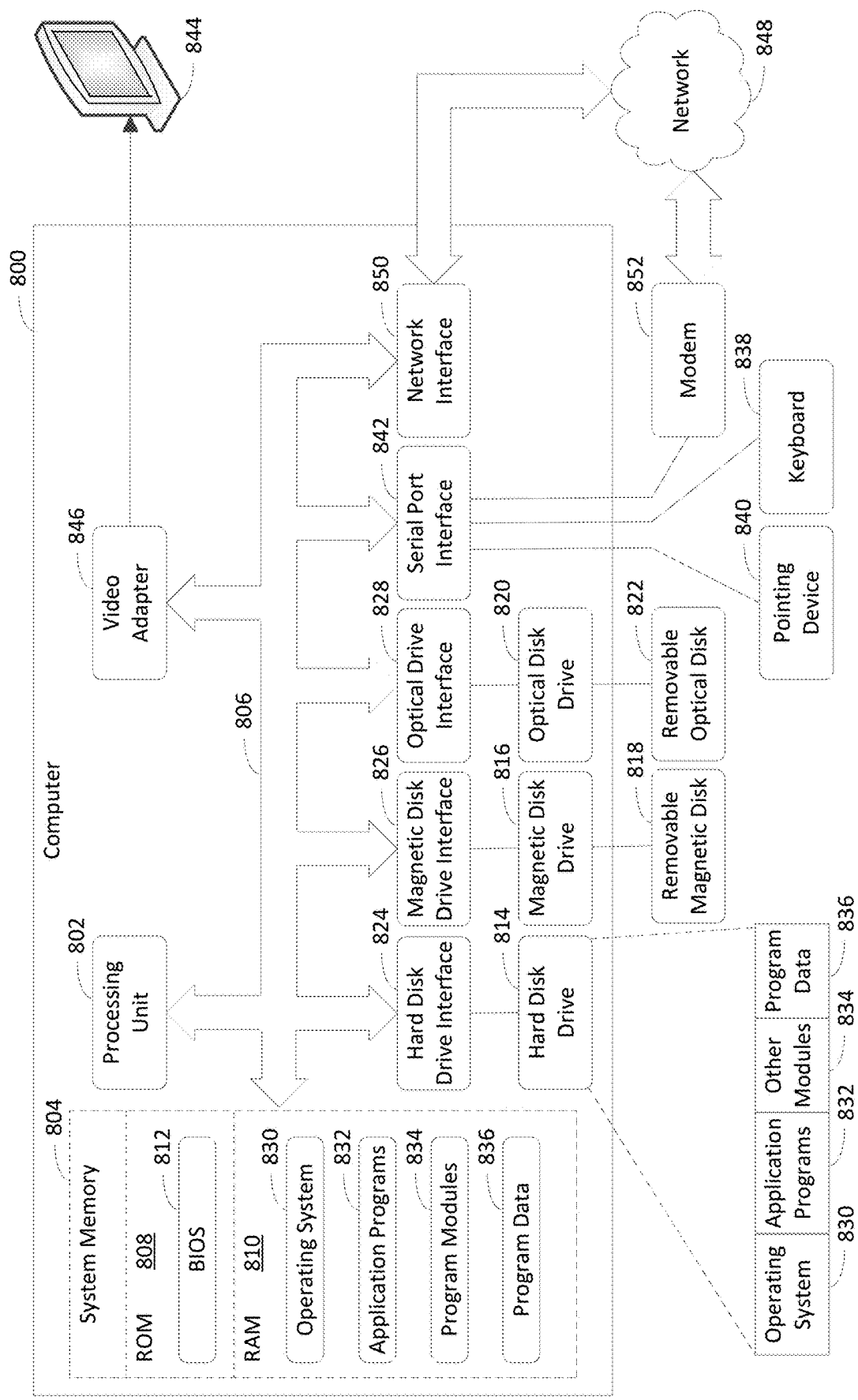
FIG. 8 depicts an example computer in which embodiments may be implemented.

FIG. 8 depicts an example computer 800 in which embodiments may be implemented. Any one or more of user devices 102A-102M, admin system 106, and/or any one or more of system management server(s) 110 shown in FIG. 1; and/or computing system 300 shown in FIG. 3 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) the selective throttling logic 112, the selective throttling logic 302, the client selection logic 304, the score logic 306, the comparison logic 308, the phase throttle logic 310, the issue logic 312, and/or flowchart 200 (including any step of flowchart 200), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
memory; and
one or more processors coupled to the memory, the one or more processors configured to selectively throttle incremental phases of an implementation of configuration changes on respective subsets of a plurality of client devices during respective sequential periods of time by performing operations for each subset during a respective first phase that precedes a respective next phase of the implementation, the operations comprising:
gather information regarding the first phase of the implementation from the client devices in the subset;
based at least in part on the information, generate a score that indicates an extent to which metrics associated with the implementation are satisfied during the first phase;
compare the score to a reference score for the subset to determine whether the score is within a specified tolerance associated with the reference score; and
based at least in part on whether the score is within the specified tolerance associated with the reference score, selectively throttle the next phase of the implementation, including selectively delaying implementation of at least a portion of the configuration changes that are implemented during the next phase.

2. The system of claim 1, wherein the one or more processors are configured to perform the operations further comprising:
automatically select a plurality of groups of client devices in an enterprise on which to implement a plurality of respective incremental portions of an enterprise-wide implementation of the configuration changes based at least in part on each group being a statistically representative sample of an entirety of the client devices in the enterprise, wherein a difference between attributes of each statistically representative sample and attributes of the entirety of the client devices in the enterprise is within a designated statistical tolerance;
wherein a first group of the plurality of groups includes the plurality of client devices; and
wherein a first portion of the enterprise-wide implementation of the configuration changes includes the incremental phases of the implementation of the configuration changes on the respective subsets of the plurality of client devices.

3. The system of claim 1, wherein the one or more processors are configured to perform the operations further comprising:
automatically select a plurality of groups of client devices in an enterprise on which to implement a plurality of respective incremental portions of an enterprise-wide implementation of the configuration changes based at least in part on the client devices in each group having a common attribute;
wherein a first group of the plurality of groups includes the plurality of client devices; and
wherein a first portion of the enterprise-wide implementation of the configuration changes includes the incremental phases of the implementation of the configuration changes on the respective subsets of the plurality of client devices.

4. The system of claim 1, wherein the one or more processors are configured to perform the operations further comprising:
analyze historical data to determine an amount of time that end users have historically taken to authorize implementation of configuration changes on their client devices in response to receipt of a solicitation to authorize the implementation; and
based at least in part on the amount of time that the end users have historically taken to authorize implementation of configuration changes on their client devices in response to receipt of a solicitation to authorize the implementation, automatically select a plurality of groups of client devices in an enterprise on which to implement a plurality of respective incremental portions of an enterprise-wide implementation of the configuration changes.

5. The system of claim 1, wherein the score indicates a user experience boot times of a first plurality of end users that result from implementation of the configuration changes on the client devices in the subset;
wherein the first plurality of end users is associated with the client devices in the subset;
wherein the reference score indicates boot times of a second plurality of end users; and
wherein the second plurality of end users is associated with client devices on which the implementation of the configuration changes has not occurred.

6. The system of claim 5, wherein the reference score indicates boot times of the first plurality of end users prior to the implementation of the configuration changes on the client devices in the subset.

7. The system of claim 1, wherein the score indicates a first security posture of the client devices in the subset, the first security posture indicating at least one of the following:
an ability of the client devices in the subset to withstand a cybersecurity threat, or
an extent to which the client devices in the subset pose a risk to cybersecurity of an enterprise; and
wherein the reference score indicates a second security posture of client devices on which the implementation of the configuration changes has not occurred, the second security posture indicating at least one of the following:
an ability of the client devices on which the implementation of the configuration changes has not occurred to withstand a cybersecurity threat, or
an extent to which the client devices on which the implementation of the configuration changes has not occurred pose a risk to cybersecurity of the enterprise.

8. The system of claim 1, wherein the one or more processors are configured to perform the operations comprising:
throttle the next phase of the implementation based at least in part on the score not being within the specified tolerance associated with the reference score.

9. The system of claim 1, wherein the one or more processors are configured to perform the operations comprising:
determine that a factor that is not a result of implementing the configuration changes negatively impacts the score;
determine that the score is not within the specified tolerance associated with the reference score; and
not throttle the next phase of the implementation, even though the score is not within the specified tolerance associated with the reference score, based at least in part on the factor negatively impacting the score.

10. The system of claim 1, wherein the one or more processors are configured to perform the operations comprising:
for each client device, determine a likelihood that the client device is to be attacked with malware; and
selectively throttle the next phase of the implementation further based at least in part on the likelihoods that the respective client devices in the subset are to be attacked with malware.

11. A method comprising:
selectively throttling incremental phases of an implementation of configuration changes on respective subsets of a plurality of client devices during respective sequential periods of time by performing operations for each subset during a respective first phase that precedes a respective next phase of the implementation, the operations comprising:
gathering information regarding the first phase of the implementation from the client devices in the subset;
based at least in part on the information, generating a score that indicates an extent to which metrics associated with the implementation are satisfied during the first phase;
comparing the score to a reference score for the subset to determine whether the score is within a specified tolerance associated with the reference score; and
based at least in part on whether the score is within the specified tolerance associated with the reference score, selectively throttling the next phase of the implementation, including selectively delaying implementation of at least a portion of the configuration changes that are implemented during the next phase.

12. The method of claim 11, further comprising:
automatically selecting a plurality of groups of client devices in an enterprise on which to implement a plurality of respective incremental portions of an enterprise-wide implementation of the configuration changes based at least in part on each group being a statistically representative sample of an entirety of the client devices in the enterprise, wherein a difference between attributes of each statistically representative sample and attributes of the entirety of the client devices in the enterprise is within a designated statistical tolerance;
wherein a first group of the plurality of groups includes the plurality of client devices; and
wherein a first portion of the enterprise-wide implementation of the configuration changes includes the incremental phases of the implementation of the configuration changes on the respective subsets of the plurality of client devices.

13. The method of claim 11, further comprising:
automatically selecting a plurality of groups of client devices in an enterprise on which to implement a plurality of respective incremental portions of an enterprise-wide implementation of the configuration changes based at least in part on the client devices in each group having a common attribute;
wherein a first group of the plurality of groups includes the plurality of client devices; and
wherein a first portion of the enterprise-wide implementation of the configuration changes includes the incremental phases of the implementation of the configuration changes on the respective subsets of the plurality of client devices.

14. The method of claim 11, wherein the score indicates performance of the client devices in the subset; and
wherein the reference score indicates performance of client devices on which the implementation of the configuration changes has not occurred.

15. The method of claim 11, wherein selectively throttling the incremental phases of the implementation of the configuration changes on the respective subsets of the client devices comprises:
throttling the next phase of the implementation based at least in part on the score not being within the specified tolerance associated with the reference score.

16. The method of claim 11, wherein selectively throttling the incremental phases of the implementation of the configuration changes on the respective subsets of the client devices comprises:
selectively throttling incremental phases of a deployment of software on the respective subsets of the client devices.

17. The method of claim 11, wherein selectively throttling the incremental phases of the implementation of the configuration changes on the respective subsets of the client devices comprises:
selectively throttling incremental phases of enabling disk encryption on the respective subsets of the client devices.

18. The method of claim 11, wherein comparing the score to the reference score for the subset comprises:
determining that the score is not within the specified tolerance associated with the reference score;
wherein the method further comprises:
identifying a source of an issue that causes the score to not be within the specified tolerance associated with the reference score; and
resolving the issue in response to identifying the source of the issue; and
wherein selectively throttling the next phase of the implementation comprises:
performing the next phase of the implementation in response to the issue being resolved.

19. The method of claim 11, wherein comparing the score to the reference score for the subset comprises:
determining that the score is not within the specified tolerance associated with the reference score; and
wherein the method further comprises:
based at least in part on the score not being within the specified tolerance associated with the reference score, notifying an administrator that the next phase of the implementation of the configuration changes is likely to negatively impact experiences of users of the respective subset of computing devices.

20. A computer program product comprising a computer-readable storage medium, which is not a signal, having instructions recorded thereon for enabling a processor-based system to perform operations, the operations comprising:

selectively throttle incremental phases of an implementation of configuration changes on respective subsets of a plurality of client devices during respective sequential periods of time by performing actions for each subset during a respective first phase that precedes a respective next phase of the implementation, the actions comprising:

gather information regarding the first phase of the implementation from the client devices in the subset;

based at least in part on the information, generate a score that indicates an extent to which metrics associated with the implementation are satisfied during the first phase;

compare the score to a reference score for the subset to determine whether the score is within a specified tolerance associated with the reference score; and based at least in part on whether the score is within the specified tolerance associated with the reference score, selectively throttle the next phase of the implementation by selectively delaying initiation of at least a portion of the configuration changes that are implemented during the next phase.

* * * * *